Figure 1:
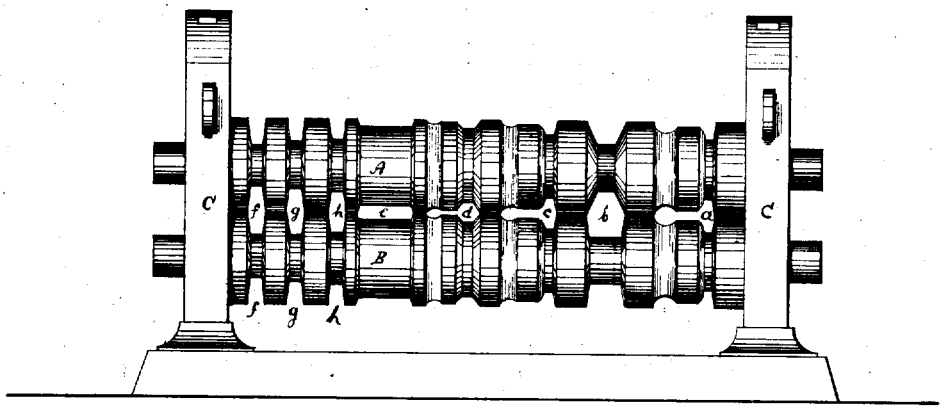

H. CHISHOLM.

Rolls for Utilizing Fag-Ends of Rail-Road Rails.

No. 6,484. Reissued June 15, 1875.

Witnesses.

Walt Mills

Wells W. Leggett

Inventor.

Henry Chisholm

By Leggett & Leggett

Attorneys.

UNITED STATES PATENT OFFICE.

HENRY CHISHOLM, OF CLEVELAND, OHIO.

IMPROVEMENT IN ROLLS FOR UTILIZING THE FAG-ENDS OF RAILROAD-RAILS.

Specification forming part of Letters Patent No. 124,116, dated February 27, 1872; reissue No. 6,481, dated June 15, 1875; application filed February 15, 1875.

*To all whom it may concern:*

Be it known that I, HENRY CHISHOLM, of Cleveland, county of Cuyahoga, State of Ohio, have invented new and Improved Rolls for Utilizing Worn and Crop Ends and other parts of Steel and Iron Railway-Rails; and do hereby declare the following to be such a full, clear, and exact description thereof as will enable others skilled in the art to which my invention relates to make and use it, reference being had to the accompanying drawings, which form a part of my specification:

My invention relates, first, to a new method of manufacture, whereby old steel rails or the fag or the butt ends of steel rails are formed into bars of a different shape in cross-section, and of uniform and homogeneous texture; second, to a peculiar formation or construction of rolls for the purpose of utilizing the butts, fag-ends, worn out, and old steel railway-rails. It is well known among those skilled in the art to which my invention pertains that steel cannot be perfectly welded to steel without much expense in time and labor, and without the use of a flux. It is also well known that pieces of steel cannot be piled alone or with iron, and then be united by welding, hammering, or rolling into a compact and homogeneous mass without resorting to the use of flux and much skill and labor. By piling, lapping, fagoting, or folding pieces of steel together, and without the use of flux, subjecting the same to a welding-heat, and afterward subjecting them to a compression, either by rolling or hammering, the product will not be a homogeneous mass, free from flaws, but seams will occur throughout the entire structure, because of the difficulty in welding steel to steel, or steel to iron, under such conditions, and the product will therefore be much impaired. Various expedients have been resorted to for the purpose of utilizing the butts or fag-ends cut off from steel railway-rails during the process of their manufacture, but the said expedients have proved to be expensive or impracticable when compared to the improvements herein described. The object of my invention is to form from the said old rails or fag-ends a bar that shall be of a different sectional form, but which shall be of uniform and homogeneous texture, and it is effected by heating the said butt-ends, fag-ends, or old rails, and then drawing them out in such a manner as to preserve the same external surface—that is, in such a manner that the outer surface of the steel rail, butt-end, or fag-end that is being drawn out shall not be turned in or crimped upon itself in the operation of rolling out, or that the product, no matter what its cross-section may be, whether of the same size or of a different size, and whether of nearly the same shape or of a different shape, will possess the same external surface that was presented externally in the piece before it was rolled or drawn out.

Figure 2:
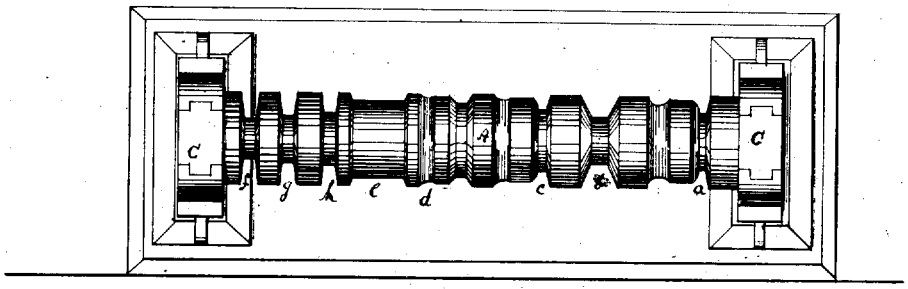
Figure 3:
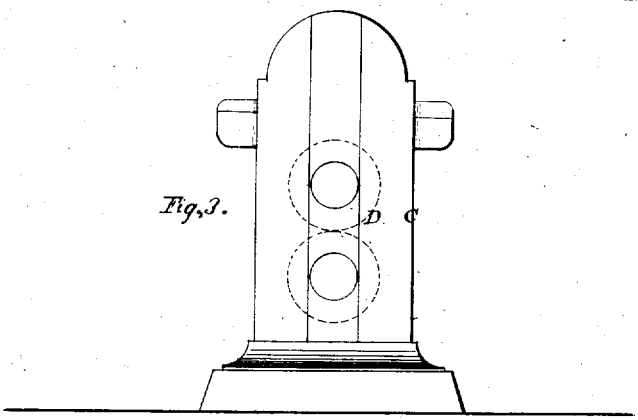

In the drawings, Figure 1 is a side view of the rolls employed in carrying out my invention. Fig. 2 is a top view, and Fig. 3 is an end view.

A represents the top roll, and B the lower one, which are mounted and supported in housing C, in any of the usual modes. On the shaft, at the outer ends, is attached gearing of any suitable nature, whereby the said rolls may be turned in the proper direction. At *a* are grooves so turned out that when placed in apposition they present a form similar to an ordinary railway-rail, though somewhat contracted on the flanges and on the sides of the tread, and slightly elongated. The rail may be first passed through these grooves, which will slightly change its form without crimping or lapping in of its external surface. In making this pass the piece, or butt, or old rail, is reduced in size and extended in length in the same proportion. After having passed through the rolls at *a*, it may then be entered between the rolls at *b*, for the purpose of compressing the metal vertically, the said grooves *b* being of such a shape as not to turn in or crimp the outer surface upon itself. It may then be passed through the grooves *c* and *d*, which gradually change the sectional form, but still preserve the integrity of its external surface. It is then in a condition that it may be passed through grooves *e* without turning in or crimping its external surface, the object being to reduce it to a bar or rod of any desired section which shall have the same surface that was possessed by the material before it entered the grooves *a*. Instead of passing the bar through the grooves *e*, it may, after it has been reduced to a shape whose external surface is no longer liable to be lapped or crimped upon itself, be passed through grooves *f g h*, or grooves of any other suitable shape, whereby it is finally formed into a rod or bar of any desired cross-section.

By the operation above described, it will be seen that in no instance is the bar caused to lap or crimp upon itself so as to require a welding together of two surfaces or different parts of the same surface, the result being a rod or bar of steel of a uniform and homogeneous texture free from flaws or seams, and of any desired shape in cross-section.

It is evident that the shape of the grooves is not limited to the peculiar forms shown in the drawings, but any form of grooves will answer the purpose that will gradually reduce the rail, butt-end, &c., from its original shape to any other desired shape without causing the outer surface to fold or lap upon itself during the operation. We find, however, the form here shown to be practicable.

What I claim is—

1. The rolls A and B, provided with the series or system of grooves, constructed substantially as described, to gradually alter the sectional form of a railroad-rail, or fag-end, &c., without crimping or lapping its external surface, substantially as and for the purpose described.

2. The rolls A B, having a series of irregular shaped and graduated grooves of the form or construction shown at *a c d*, operating conjointly as and for the purpose substantially as described.

3. The manufacture of bars of steel homogeneous in texture, from old rails, butts, or fag-ends by a process or method substantially such as that hereinbefore described—that is to say: rerolling said old rails, butts, or fag-ends, by means of rollers having grooves so constructed that the body of the rail, butt, or fag end shall, by this operation upon it, be gradually contracted transversely and increasingly extended longitudinally without violent rupture and without plication of the surface.

HENRY CHISHOLM.

Witnesses:
WELLS W. LEGGETT,
C. B. BEACH.